INVENTORS
ROBERT H. DENNARD
HANS Y. JULIUSBURGER
NORIYUKI NAKAGAWA
GERVYDAS E. SIMAITIS
BY Stephen J. Limanek
ATTORNEY 3,234,470

LOGICAL SYSTEMS UTILIZING PHASE LOCKED SUBHARMONIC OSCILLATORS

Robert H. Dennard and Hans Y. Juliusburger, Ossining, N.Y., Noriyuki Nakagawa, Madison, Wis., and Gervydas E. Simaitis, Waverly, N.Y., assignors to International Business Machines Corporation, New York, N.Y., a corporation of New York Filed Dec. 27, 1961, Ser. No. 162,441
8 Claims. (Cl. 328—92)

Figure 1:
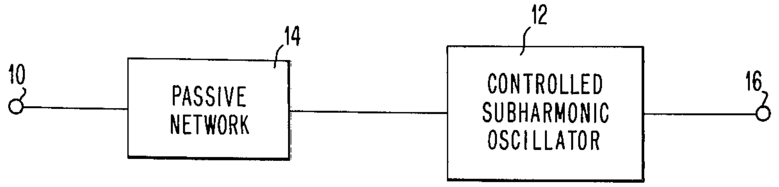

This invention relates to systems for performing logical operations and more particularly to logical systems which utilize phase-locked oscillators.

In recent years there has been described in the literature phase-locked circuits which may be used in logical systems operating at high speeds and having long life and great reliability. These circuits are designed to provide at least two stable phases of an alternating current signal, each stable phase representing one value of a binary digit of information. To produce the multiphase circuits, a non-linear capacitance, generally provided by a non-linear capacitance diode, is utilized in one form of these circuits, for example, as described in U.S. Patent No. 2,815,488 granted to J. VonNeumann on December 3, 1957. In another form of these circuits a non-linear inductance may be used, as described by E. Goto in an article entitled "The Parametron, a Digital Computing Element Which Utilizes Parametric Oscillation," in Proceedings of the IRE, volume 47, No. 8, August 1959. Circuits exhibiting the principles described in the above mentioned phase-locked circuits have been generally referred to as parametric circuits, such as parametric oscillators, parametric amplifiers, etc. A comprehensive list of articles on parametric circuits may be found in the May 1960 issue of the Proceedings of the IRE on pages 848 to 853.

Known commercially available data processing systems or computers in operation today utilize binary logic and have bistable circuits providing signals representing a "1" and a "0." This binary logic or binary switching algebra is related to the Aristotelian based calculus of propositions which is always analogous or can be reduced to assertions concerning the truthfulness or falseness of a statement. In order to effectively utilize three-state or higher order logic devices it is necessary to depart from this binary concept of a statement being either true or false as exemplified by the case of an ordinary gate which either conducts or does not conduct. It is not readily apparent what means are available to replace this true-false dichotomy but the conceptual difficulty may be eliminated if it is realized that for the purpose of ternary or higher order switching algebra the devices used are primarily viewed as decision making elements rather than as a means for operating on propositions. By taking this point of view it can be seen that, for example, a two input element having two ternary inputs A and B and one ternary output C is merely a device which selects a specified output for each of the possible nine input combinations and as in binary logic such specifications can be represented by means of a truth table. Since a switching device can be viewed merely as a decision making element which relates its output to its various input combinations there should be no conceptual difficulty involved in assigning to each of its terminals an arbitrary large number of states thereby obviously increasing the logic density of the system.

To perform multi-valued logic of a given order in conjunction with switching circuits it is desirable to have an inherently multi-stable switching element of the given order. It is also desirable to have available a suitable algebra. A suitable algebra can be defined as one in which the basic functions namely those that are expressed by basic operating symbols are equivalent to the output or transfer functions of the available logic switching elements. An algebra which has been found suitable for performing multi-valued logic is the so-called Post algebra, described in American Journal of Mathematics, volume 43, pages 163 to 185, "Introduction to a General Theory of Elementary Propositions" by E. I. Post.

As disclosed in the literature, for example, in the above mentioned VonNeumann patent, phase logic may be utilized in parametric circuits which provide a subharmonic of the frequency of the carrier or pump voltage applied to the parametric circuit. It has been found that the second subharmonic of the carrier wave, that is, the subharmonic having a frequency equal to ½ the frequency of the carrier wave, is phase stable at two phase positions of the second subharmonic frequency mutually differing by 180°. In order to produce in a parametric circuit the second subharmonic with a given one of two phases, a control voltage derived from an external source and having a frequency equal to the frequency of the second subharmonic wave and having the desired phase is applied to a tank of the parametric circuit which is tuned approximately to the second subharmonic frequency. This control voltage of predetermined or given phase, which is referred to as a seeding voltage, may be of an amplitude sufficiently large to override the subharmonic wave produced in the tuned circuit in order to switch the voltage in the tuned circuit from one stable phase to the other stable phase, or a seeding voltage of a relatively low amplitude may be used if the carrier or pump wave amplitude is increased from a low value to a normal or operating value while the seeding voltage is applied to the circuit. The phase of the subharmonic voltage in the tuned circuit will correspond to the phase of the control voltage and an amplified subharmonic voltage will be produced at the output of the parametric circuit.

A simple parametric circuit arrangement for producing subharmonics of a carrier voltage consists of a linear inductor serially connected to a semiconductor diode having a non-linear junction capacitance. When the diode has a capacitance characteristic which is sharply non-linear, the circuit is theoretically capable of producing subharmonics of any order. In this simple parametric circuit, as the applied carrier voltage is increased in amplitude from a low or zero value to a higher given value a second subharmonic is produced. A further increase in the carrier voltage amplitude produces a third order oscillation in the parametric circuit. Increasing the amplitude of the carrier voltage still further produces higher and higher order of subharmonics up to some practical limit which may be as high as 10 or 12. This basic parametric circuit is not desirable for many applications where logical operations are to be performed, for example, for performing ternary logic, since it operates in a fairly narrow range of carrier voltage, thus close tolerance must be maintained, and since the phase of oscillation is difficut to control, due in part to the sharp capacitance non-linearity, the final phase of oscillation is influenced by the random behavior in the transitional period before the circuit is stabilized at the third subharmonic as well as by the small seeding signal which is applied to the tuned circuit. A large seeding signal would be necessary to assure reliable operation of such a circuit to perform ternary logic functions. However, parametric oscillators are known which provide a stable third order oscillation suitable for use in performing, for example, ternary logic. These suitable oscillators inherently prevent the formation of second order subharmonics and have been found to operate reliably with wide tolerances of circuit values. Oscillators of this type have been described in U.S. patent application having Serial No. 104,974 entitled "Parametric Circuits," filed by R. H. Dennard on April 24, 1961.

An object of this invention is to provide improved logical systems.

Another object of this invention is to provide improved means for controlling subharmonic oscillators.

A further object of this invention is to provide improved multi-valued logical operations by utilizing oscillators which are at least tristable.

Yet a further object of this invention is to provide a higher order of computer logic utilizing circuits having two or more inputs to which are applied ternary digits and one or more outputs from which are produced ternary digits which represent, for example, "0," "1" and "2."

In accordance with this invention, logical systems are provided having parametric circuits controlled by input circuits which modify a characteristic of an input signal, for example, by altering the amplitude or phase, or both, of the signal therein and then vectorially adding these signals to produce a desired resultant control or seeding wave.

An important advantage of the logic system of the present invention is that it is more versatile than systems using a comparable number of binary electrical elements.

An important feature of the present invention is that the system requires only relatively simple and inexpensive coupling elements to perform the desired logic.

The foregoing and other objects, features and advantages of the invention will be apparent from the following more particular description of preferred embodiments of the invention, as illustrated in the accompanying drawings.

Figure 2:
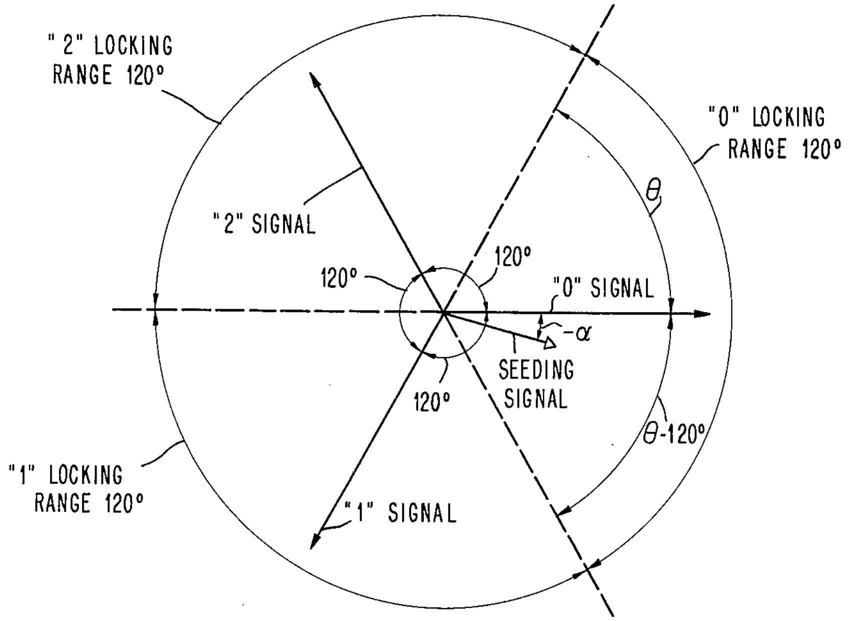
Figure 3:
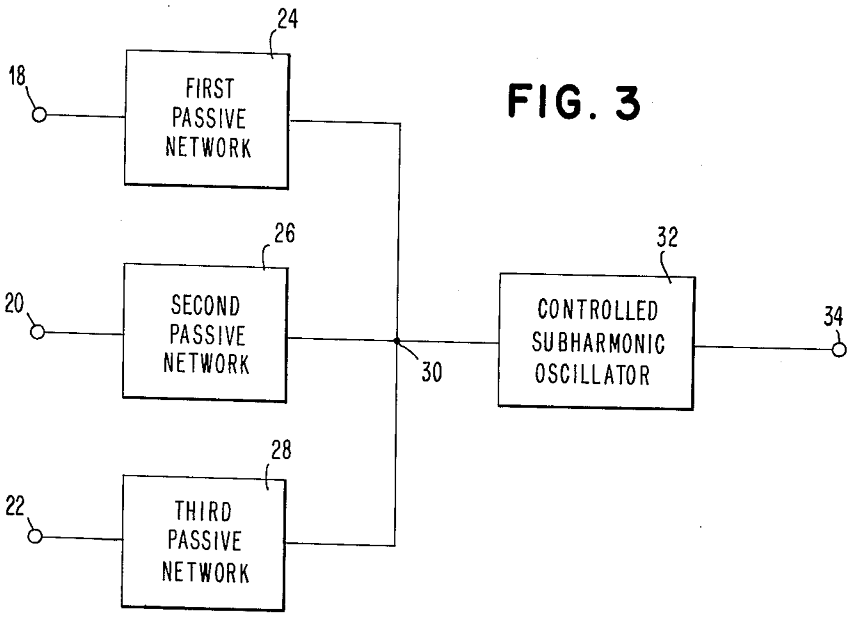
Figure 4:
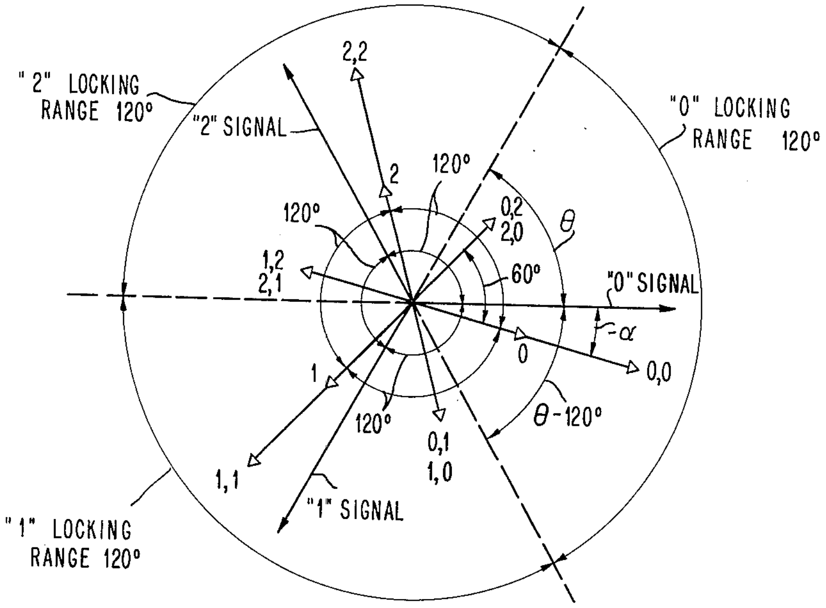
Figure 5:
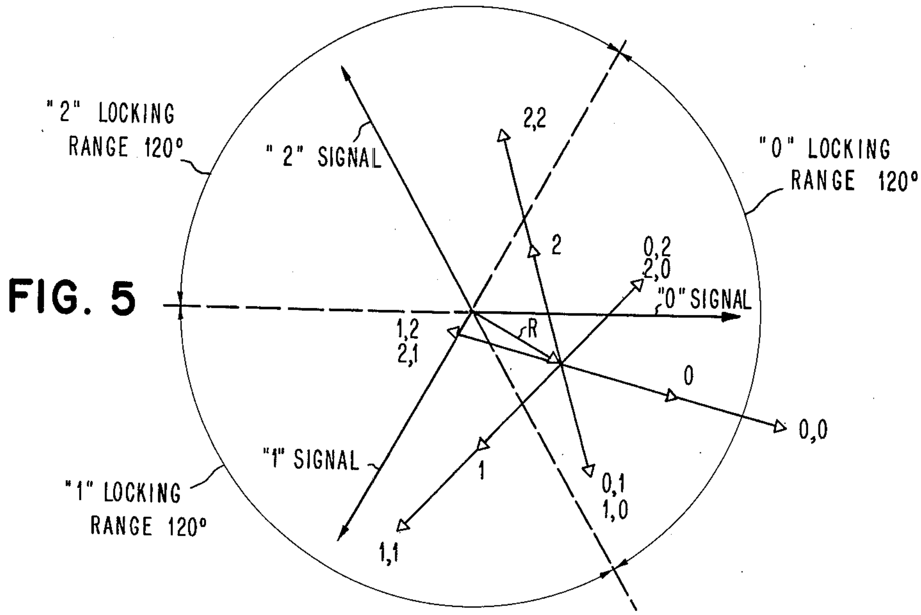
Figures 6, 7:
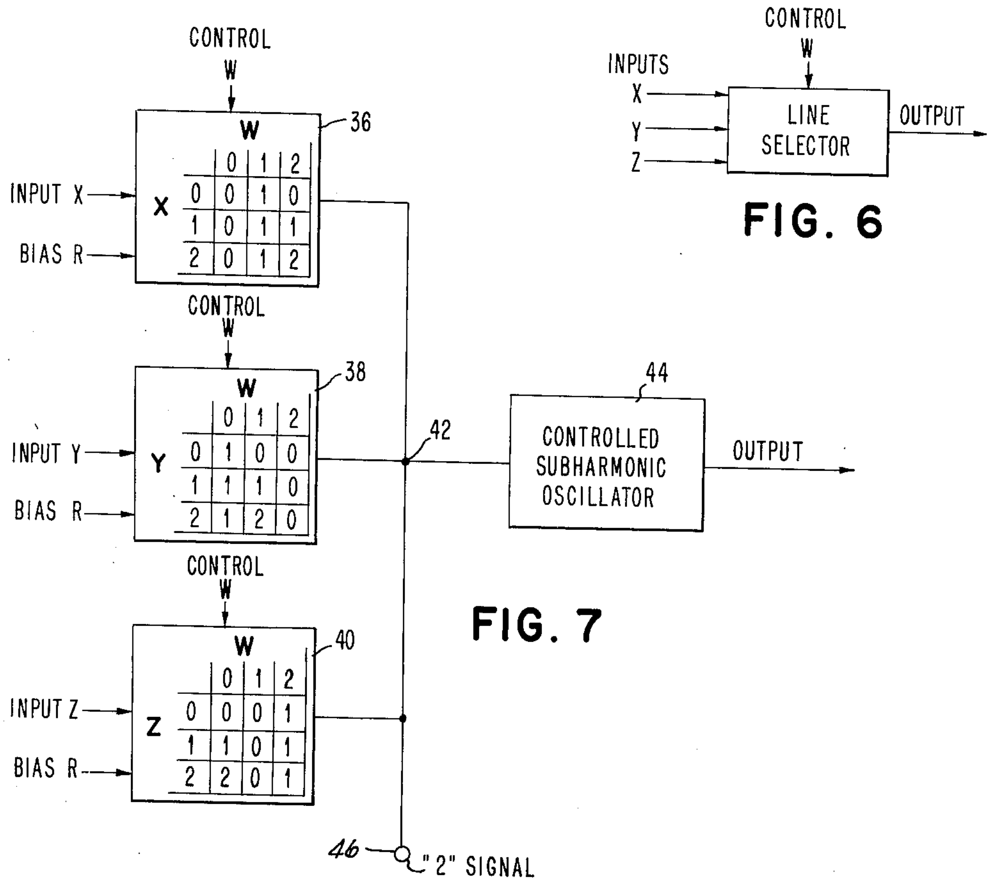

In the drawings:

FIG. 1 illustrates in block form a system for controlling a phase-locked oscillator capable of performing a logical function, FIG. 2 is a vector representation of signals or waves found in the system illustrated in FIG. 1, FIG. 3 illustrates in block form a phase-locked system capable of performing logical functions which has a plurality of input or control signals, FIG. 4 is a vector representation of the signals or waves produced in one embodiment of the logical system of the present invention illustrated in FIG. 3, FIG. 5 is a vector representation of signals or waves in another embodiment of the logical system of the present invention illustrated in FIG. 3, FIG. 6 illustrates the system of the present invention when used as a gating device or line selector, and FIG. 7 is a more detailed illustration of the gating device shown in FIG. 6.

Referring to the drawings in more detail, there is shown in FIG. 1 an input terminal 10 for receiving an electric signal or wave having a given phase from, for example, a third subharmonic oscillator or any suitable source (not shown). The terminal 10 is connected to a subharmonic oscillator 12 through a passive network 14 which may be, for example, an attenuating element, a capacitor, an inductor or a transformer. The oscillator 12 is preferably a parametric oscillator, of the type described in the above mentioned Dennard application, which is phase controlled by a seeding signal applied thereto, which applies an output voltage to an output terminal 16.

When the oscillator 12 shown in FIG. 1 of the drawing is a subharmonic oscillator producing the third subharmonic of the carrier or pumping voltage, the output voltages applied to terminal 16 and a controlling or seeding voltage thereof may be represented by the vectors shown in FIG. 2 of the drawing. When a third subharmonic oscillation is produced by the oscillator 12, the oscillation has one of three possible phases, each being separated 120° from the other two phases, a first phase being represented by a "0" signal vector, a second phase being represented by a "1" signal vector and a third phase being represented by a "2" signal vector in FIG. 2 of the drawing. The particular one of these three phases at which the output will become stabilized is determined by the phase of the seeding signal relative to the possible phases of the output voltages. In FIG. 2 the seeding signal at the oscillator 12 is represented by a seeding signal vector which is separated from the "0" signal vector by $-\alpha$ degrees, assuming the "0" signal vector to be the zero reference vector. This seeding signal causes the oscillator 12 to produce an output signal having the "0" signal vector. The range of the deviation of the seeding signal vector with respect to the "0" signal vector which will produce an output signal having the "0" signal vector is from $\theta$° to $\theta-120$° providing a "0" locking range of 120°, as indicated in FIG. 2 of the drawing. The value of $\theta$ is determined by the design and operating conditions of the oscillator 12, for example, the circuit parameters and applied fixed voltages. Similarly, the locking ranges for the "1" signal vector and for the "2" signal vector are each 120°, as indicated also in FIG. 2 of the drawing.

If the coupling network 14 is such that an oscillation of "0" phase at input terminal 10 causes a "0" phase output from the oscillator 12 then a "1" phase at terminal 10 will cause a "1" output from the oscillator 12 and a "2" phase at terminal 10 will cause a "2" output from the oscillator 12. Signal transfer is thus effected. Similarly, by properly designing the phase shift in the coupling network 14 it is possible to produce an output in the oscillator 12 which always leads the signal from the terminal 10 by 120°, thus, "0," "1" and "2" phase signals at input terminal 10 produce "2," "0" and "1" phase outputs, respectively, from the oscillator 12, or which always lags the signal from the terminal 10 by 120°, thus, "0," "1" and "2" phase signals at the input terminal 10 produce "1," "2" and "0" phase outputs, respectively, from oscillator 12.

If the passive network 14 were a resistive network the phase of the input signal at the input terminal 10 would be substantially the same as the phase of the seeding signal vector shown in FIG. 2. However, if it were desired to apply a seeding signal having the phase of the seeding signal vector shown in FIG. 2 when the phase of the signal at the input terminal 10 differened from the phase of the desired seeding signal the passive network 14 would have a reactance value sufficient to produce the necessary rotation of the phase to provide the desired phase at the oscillator 12. When the magnitudes of the available phase at the input terminal 10 and the desired phase at the oscillator differ by 90°, then the available phase may be suitably rotated by providing effectively a pure inductor or capacitor for the passive network 14. It can be seen that by merely providing a suitable passive network 14 between the input terminal 10 and the subharmonic oscillator 12 the seeding signal vector may be positioned within the "1" locking range to produce a "1" signal at the output of the oscillator 12 or within the "2" locking range to produce a "2" signal in addition to producing the "0" signal when the seeding signal vector lies between $\theta$° and $\theta-120$°.

It can also be seen that if the subharmonic oscillator 12 were of the type which produced a second subharmonic oscillation, which is phase bistable, the locking range of each of the two possible phases would be 180°. To provide logic transfer with this type of oscillator the passive network 14 would be substantially resistive and if inversion were desired a 180° phase shift could be provided by using a transformer as the passive network 14. Inversion may also be accomplished with this type of oscillator by using an inductor as the passive network 14 and decreasing to substantially zero the bias voltage generally applied to the non-linear capacitance diode of the subharmonic oscillator 12. When the bias of the oscillator 12 is zero, the capacitance of the diode is relatively large and the impedance of the tank is capacitive. Current passing through the inductor lags the voltage at the input terminal by approximately 90° and the current from the inductor flowing into the tank of the oscillator 12 develops a voltage across the tank which lags by an additional amount, which would be 90° for a lossless tank. Thus, if the voltage at the input terminal has a "0" phase, then the voltage across the oscillator 12 is much closer to the "1" phase than to the "0" phase, and, therefore, inversion would be accomplished.

FIG. 3 shows first, second and third input terminals 18, 20 and 22 coupled through first, second and third passive networks 24, 26 and 28, respectively, and through a common point 30 to a subharmonic oscillator 32 having an output terminal 34. The first, second and third passive networks 24, 26 and 28 may also be, for example, attenuating elements, inductors, capacitors or transformers, and the subharmonic oscillator 32 is preferably of the type described in the above mentioned Dennard application. The impedance of each of the passive networks 24, 26 and 28 is, preferably, high compared to the input impedance of the subharmonic oscillator 32 at the point 30 so that the current through each of the passive networks is related to the input voltage of that network and is independent of the currents in the other passive networks to produce at the point 30 a current which is the vector sum of the currents passing through each of the passive networks 24, 26 and 28.

FIG. 4 of the drawing provides a vector representation of voltages which may be found in the system illustrated in FIG. 3. Since the subharmonic oscillator 32 shown in FIG. 3 is of the same type as the oscillator 12 in FIG. 1, the output signals from the oscillator 32 of FIG. 3 may be represented vectorially in the same manner as the output signals from the oscillator 12 of FIG. 1 are represented in FIG. 2 of the drawing. Accordingly, it can be seen that in FIG. 4 the "0," "1" and "2" signal vectors are similar to the "0," "1" and "2" signal vectors shown in FIG. 2. If the first passive network 24 of FIG. 3 is similar to the passive network 14 of FIG. 1 and if the phases of the voltage at the input terminal 10 of FIG. 1 and at the first input terminal 18 are the same, with no voltage being applied to the oscillator 32 from the second and third passive networks 26 and 28, the seeding signal or voltage applied to the oscillator 32 of FIG. 3 is the same as the seeding voltage applied to the oscillator 12 of FIG. 1 and is represented in FIG. 4 by a vector, shown having a hollow arrowhead, spaced from the "0" signal vector by an angle equal to $-\alpha$ degrees and identified by a 0 reference numeral. If only this seeding voltage is applied to the oscillator 32 the output signal will be the signal represented by the "0" signal vector. Now if the second passive network 26 also applies a seeding signal or voltage to the oscillator 32 similar to that applied by the first passive network 24 there will be produced at the common point 30 a resultant seeding signal which may be represented by the hollow arrowhead vector identified by 0,0 reference numerals which is also spaced from the "0" signal vector by $-\alpha$ degrees. It can be seen that when the seeding voltage represented by the 0,0 vector is applied to the oscillator 32 the output signal will also be the signal represented by the "0" signal vector since the 0,0 vector lies within the "0" locking range of the oscillator 32. If a seeding signal having a phase which lags the 0 vector by 120° is applied to the oscillator 32 from the first passive network it may be represented by the hollow arrowhead vector 1 and if both first and second passive networks 26 and 28 apply such a seeding signal simultaneously to the oscillator 32, the resultant seeding signal may be represented by the vector 1,1 which will provide an output signal represented by the "1" signal vector. Similarly, seeding voltages represented by hollow arrowhead vectors 2 and 2,2 which lead the 0 vector by 120° will provide an output signal represented by the "2" signal vector.

When the first and second passive networks 24 and 26 apply seeding signals having different phases to the oscillator 32 the output signal produced by the oscillator 32 will depend upon the locking range within which the resultant of these two seeding signals is located. Thus, it can be seen that if one of the two passive networks 24 and 26 applies a seeding signal represented by the 0 vector and the other of these two networks 24 and 26 applies a seeding signal represented by the 1 vector, a resultant vector identified by reference numerals 0,1 and 1,0 will be produced which lies in the "1" locking range to, thus, produce an output voltage represented by the "1" signal vector. A resultant vector 0,2 and 2,0 of the 0 and 2 vectors is shown in FIG. 4 to lie within the "0" locking range and the resultant vector 1,2 and 2,1 is shown to lie within the "2" locking range. Accordingly, it can be seen that when more than one input signal is used to seed an oscillator, the effective seeding current is the vector sum of the individual input signals as modified by the passive or coupling networks.

Since the seeding signals represented by the 0 vector and by the 2 vector are of equal magnitude and are separated by 120°, the resultant vector 0,2 and 2,0 is separated from the 0 vector by 60°. When the system of the present invention is designed so that both the 0 vector and the 0,2 and 2,0 vector lie within the "0" locking range, that is, between $\theta°$ and $\theta-120°$, as shown in FIG. 4 of the drawing, the logic states produced by the various input combinations are as shown in the following truth table, which may be arbitrarily referred to as the G1 function,

TABLE I

| | | B | | |
|---|---|---|---|---|
| | | 0 | 1 | 2 |
| A | 0 | 0 | 2 | 0 |
| | 1 | 1 | 1 | 2 |
| | 2 | 0 | 2 | 2 |

where A is the phase of the input signal applied to the first input terminal 18 and B is the phase of the input signal applied to the second input terminal 20 when both the first and second passive networks are substantially resistive.

If the coupling networks were changed so as to rotate all the seeding vectors by 60° in the positive or counterclockwise direction so as to place the 0,2 and 2,0 vector in the "2" locking range, the logic function illustrated in the following truth table would then be produced, which may arbitrarily be referred to as the G2 function.

TABLE II

| | | B | | |
|---|---|---|---|---|
| | | 0 | 1 | 2 |
| A | 0 | 0 | 0 | 2 |
| | 1 | 0 | 1 | 1 |
| | 2 | 2 | 1 | 2 |

A ternary logic function involving two inputs has eight different combinations of the basic G1 function which can be achieved by introducing addition 120° phase shifts, either positive or negative, in one or both of the first and second passive networks 24 or 26. This phase shift produces cyclic interchanges of the rows or of the columns, or both, in the truth table. All possible permutations may be seen from a 5 x 5 matrix which is formed from the basic truth table matrix by repeating the first and second rows and columns as illustrated in the following truth table, which may be referred to as functions G1–1, 2, 3, 4, 5, 6, 7, 8 and 9.

TABLE III

| | | | | | | |
|---|---|---|---|---|---|---|
| | 0 | 1 | 0 | 0 | 1 | |
| G1-1, 2, 3 | 1 | 1 | 2 | 1 | 1 | |
| | 0 | 2 | 2 | 0 | 2 | G1-4, 5, 6 |
| G1-7, 8, 9 | 0 | 1 | 0 | 0 | 1 | |
| | 1 | 1 | 2 | 1 | 1 | |

where, for example, the G1–1 function, i.e., the basic function, is represented by the nine digits in the upper left hand corner and G1–9 is represented by the nine digits in the lower right hand corner.

The G2 functions may also be represented by a 5 x 5 matrix as follows:

TABLE IV

| | | | | | | |
|---|---|---|---|---|---|---|
| | 0 | 0 | 2 | 0 | 0 | |
| G2-1, 2, 3 | 0 | 1 | 1 | 0 | 1 | |
| | 2 | 1 | 2 | 2 | 1 | G2-4, 5, 6 |
| G2-7, 8, 9 | 0 | 0 | 2 | 0 | 0 | |
| | 0 | 1 | 1 | 0 | 1 | |

When a third seeding signal from the third passive network 28 is also used to control the output voltage from the controlled oscillator 32, the vector representation of the signals produced in the system illustrated in FIG. 3 is that shown in FIG. 5 of the drawing. In this latter case the output phase from the third passive network 28 may be maintained at a constant value and may be represented by the vector R which is drawn from the common point of the "0," "1" and "2" signal vectors of the graph of FIG. 5. To this vector R are added vectorially all the hollow arrowhead vectors representing the various seeding signals identified in the vector diagram of FIG. 4. The output signal from the oscillator 32 corresponding to each of these input combinations is also determined by the locking range into which each of the resultant seeding signals produced at the junction or common point 30 of FIG. 3 falls. The truth table for the case illustrated by the vector diagram of FIG. 5 is as follows:

TABLE V

| | | B | | |
|---|---|---|---|---|
| | | 0 | 1 | 2 |
| A | 0 | 0 | 0 | 0 |
| | 1 | 0 | 1 | 1 |
| | 2 | 0 | 1 | 2 |

It can be seen from this truth table and from the vector diagram of FIG. 5 that a "2" output signal is produced only when a seeding signal represented by the 2,2 vector is applied to the oscillator 32.

The vector R may be derived as a vector sum of first and second signals from two suitable oscillators, the first signal having, for example, a magnitude and phase equal to that of a signal applied to terminals 18 or 20 and the second signal having a magnitude and phase such that when combined with the first signal and fed through the third passive network, which may differ from the first and second passive networks, will provide the desired resultant vector R. By introducing additional 120° phase shifts, either positive or negative, in one or both of the first and second networks 24 and 26 an additional eight new functions may be obtained. Thus, nine functions may be produced as a result of this latter scheme and and these may be represented by truth tables in the same manner as described hereinabove in connection with the G functions. Furthermore, additional 120° phase shifts in the two signals which produce the vector R will produce a multiplicity of additional logic functions.

From the foregoing description of the invention it can be readily understood that the systems described can be utilized as basic building blocks in a computer for carrying out a large number of functions and that additional functions may be carried out by further modifying the amplitudes of the input or seeding signals and varying the reactances or impedances of the passive networks.

In FIG. 6 of the drawing there is illustrated a gating device which operates as a line selector permitting the passage therethrough of only one of the three signals appearing simultaneously on the three input lines X, Y and Z at a given time interval. The gating device is designed so that the signal on the input line X, Y or X passes to the output when the control signal on line W is of a "2," "1" or "0" phase, respectively.

FIG. 7 illustrates the gating device of FIG. 6 in more detail. The gating device includes first, second and third oscillator systems 36, 38 and 40, respectively, each of the type illustrated in FIG. 3 of the drawing. The outputs of the oscillator systems 36, 38 and 40 are connected to a common point 42 before being applied to a controlled third-order subharmonic oscillator 44. Each of the oscillator systems 36, 38 and 40 includes a controlled third-order subharmonic oscillator and input circuits coupled to a common point, such as, point 30, in the manner illustrated in FIG. 3 of the drawing. The number of input circuits may be, for example, four, three of these four input circuits providing input signals of equal magnitude and the fourth input circuit providing an input signal of a different magnitude, for example, one-half the magnitude of one of the other three signals. In the gating device of FIG. 7 the control signal W is one of the three input signals having equal magnitudes and each of the input signals X, Y and Z is the signal having a different magnitude. The other two signals of the four input circuits are maintained constant at "0" and "1" phases, respectively. The "0" and "1" phase signals may be combined to form a resultant signal R, as indicated in FIG. 5 of the drawings, and are shown in FIG. 7 as a single input, the BIAS R input to each of the oscillator systems 36, 38 and 40. The truth table for the function performed by the first oscillator system 36 is shown within the block representing that system and truth tables for the functions performed by systems 38 and 40 are derivatives of the function shown in block 36 and are indicated in the two blocks 38, 40 representing these two systems. The systems 36, 38 and 40 differ only in that the passive networks of the input circuits to which the W signal is applied are designed so that signals at the output end of these three passive networks are mutually different by 120°. A final input to common point 42 is a phase two bias signal continuously applied to terminal 46.

In operation of the gating device illustrated in FIG. 7 of the drawing, it can be seen that if the control signal W is a "2" the first system 36 will pass the input signal X, which may be "0," "1" or "2," the second system 38 will pass a "0" regardles of what the value of the input signal Y may be and the third system 40 will pass a "1" regardless of what the value of the input signal Z may be. The "0" phase signal applied to the common point 42 by oscillator system 38, the "1" phase signal applied to common point 42 by oscillator system 40, and the "2" phase signal applied to common point 42 by bias terminal 46 effectively cancel each other at the common point. Therefore, subharmonic oscillator 44 is controlled by the signal passed through the first oscillator system 36 to produce at the output of subharmonic oscillator 44 a signal having the same phase as the phase of the input signal applied to input line X. In the same manner, when the control signal W is a "1" the subharmonic oscillator oscillator 44 will produce an output signal having a phase similar to the phase of the input signal at the input line Y and when the control signal W is a "0" the subharmonic oscillator 44 will produce an output signal having a phase similar to the phase of the input signal at the input line Z.

It should be understood that the basic building blocks can be combined to form many devices, other than the line selector hereinabove described, which are necessary or useful in computers or electronic data processing machines. These other devices are, for example, adders, control registers, instruction decoders, etc. By properly interconnecting such devices a complete tenary computer may be provided.

Accordingly, from the foregoing description of the third order subharmonic systems it can be readily understood that the described vectorial scheme and the resultant logic functions can be extended to fourth, fifths and higher order subharmonic systems by merely modifying the circuit parameters of the subharmonic oscillators used in the system so as to obtain those higher order subharmonics and by correspondingly modifying the interconnecting passive networks so as to conform with the rules of higher order switching algebras.

While the invention has been particularly shown and described with reference to preferred embodiments thereof, it will be understood by those skilled in the art that various changes in form and details may be made therein without departing from the spirit and scope of the invention.

What is claimed is:

1. A parametric circuit comprising a subharmonic oscillator, first and second passive networks each having an input and an output terminal, each of said passive networks varying the amplitude and phase of a signal applied to its input terminal in a predetermined manner, said first network having a characteristic different from that of said second network, means for applying control signals to each of the input terminals of said network and means for connecting the output terminal of each of said networks to the input of said subharmonic oscillator whereby the phase of the output from said subharmonic oscillator is controlled by the vector sum of the outputs from said passive networks.

2. A parametric circuit comprising an oscillator producing a third subharmonic output wave, first and second passive networks each having an input and an output terminal, said first passive network having a characteristic different from that of said second passive network, means for applying an input signal of the frequency of said oscillator output wave to the input terminals of each of said passive networks and means for coupling the output terminal of each of said passive networks to the input of said subharmonic oscillator.

3. A parametric circuit comprising a subharmonic oscillator producing a tristable phase output signal, each phase having a given locking range, means for receiving first and second input signals, means for combining said input signals so as to produce a resultant control signal having a phase and magnitude such that said control signal lies within a predetermined one of said given locking ranges and means for applying said resultant control signal to said subharmonic oscillator.

4. A line selector comprising first, second and third subharmonic oscillator circuits each producing an output wave of a given frequency and of one of three stable phases each spaced 120° from the other two phases and each having a given phase locking range, means for applying an input signal of said given frequency and of a phase corresponding to one of said three phases to the input of each of said oscillator circuits, means for applying a constant bias signal and selectively a control signal having said given frequency and one of said three phases to the input of each of said oscillator circuits, said input, control and bias signals being combined at the input of each of said oscillator circuits to produce a resultant signal at one of said oscillator circuits depending upon the phase of said control signal lying within the phase locking range of said output wave determined by the phase of its input signal, resultant signal at another of said oscillator circuits lying within one of said locking ranges for each phase of its input signal and a resultant signal at the third of said oscillator circuits lying within another of said locking ranges for each phase of its input signal, means for combining the outputs of said first, second and third oscillator circuits and means for combining a bias signal having said given frequency and a phase corresponding to the stable phase within the remaining one of said phase locking ranges to produce a resultant output voltage having a phase corresponding to the phase of the input signal of said one oscillator circuit.

5. A parametric circuit comprising a subharmonic oscillator producing a tri-stable phase output signal, each phase having a given locking range, means for receiving first and second input signals, means for combining said input signals so as to produce a resultant control signal having a phase and magnitude such that said control signal lies within a predetermined one of said given locking ranges, means for receiving a third input signal, means, including said combining means, for combining said resultant control signal and said third input signal to form a seeding signal having a phase and magnitude such that said seeding signal lies within a predetermined one of said given locking ranges, and means for applying said seeding signal to said subharmonic oscillator.

6. A parametric circuit comprising a subharmonic oscillator producing a tri-stable phase output signal, each phase having a given locking range, means for applying a bias signal to said oscillator, said bias signal having a phase and magnitude such as to lie within a predetermined one of said given locking ranges, a passive network adapted to alter the phase of an input signal applied to it, means for applying an input signal of a predetermined phase to said passive network, means for combining the output from said passive network and said bias signal, and means for applying the resultant control signal to said subharmonic oscillator.

7. A parametric circuit comprising a subharmonic oscillator producing an output wave of a given frequency and of one of three stable phases, each spaced 120° from the other two phases and each having a given phase locking range, a plurality of passive networks, each having a predetermined phase shifting characteristics, means for applying an input signal to each of said passive networks, said input signals being of said given frequency and of variable phase, means for combining the outputs from said passive networks to form a resultant control signal, and means for applying said resultant control signal to said subharmonic oscillator.

8. A parametric circuit comprising a subharmonic oscillator, a plurality of passive networks each having an input and an output terminal each of said passive networks varying the amplitude and phase of a signal applied to its input terminal in a predetermined manner, means for applying control signals to each of the input terminals of said network, and means for connecting the output terminals of each of said networks to the input of said subharmonic oscillator, whereby the phase of the output from said subharmonic oscillator is controlled by the vector sum of the outputs from said passive networks.

References Cited by the Examiner

UNITED STATES PATENTS 3,011,706 12/1961 Goto ---------------- 328—92

OTHER REFERENCES

Proceeding of the IRE, published April 1959, pages 516–523, article by R. L. Wigington entitled "A New Concept in Computing."

DAVID J. GALVIN, *Primary Examiner.*